United States Patent Office 3,442,945
Patented May 6, 1969

3,442,945
PHYTOTOXIC α-HALO-ACETANILIDES
John F. Olin, Ballwin, Mo., assignor to Monsanto Company, St. Louis, Mo., a corporation of Delaware
No Drawing. Continuation-in-part of applications Ser. No. 523,923, Feb. 1, 1966, Ser. No. 496,175, Oct. 14, 1965, Ser. No. 397,656, Sept. 18, 1964, and Ser. No. 397,637, Sept. 18, 1964. This application May 22, 1967, Ser. No. 640,350
Int. Cl. C07c *103/32;* C07d; A01n *9/20*
U.S. Cl. 260—562      71 Claims

ABSTRACT OF THE DISCLOSURE 2-substituted α-haloacetanilides with specified substituents of the 5-, 6- and N-positions; and having phytotoxic properties.

---

This application is a continuation-in-part of United States applications (1) Ser. No. 523,923, filed Feb. 1, 1966, now abandoned, which in turn is a continuation-in-part of applications Ser. No. 134,131, Ser. No. 134,158 and Ser. No. 134,160, all filed Aug. 28, 1961 and now abandoned; (2) Ser. No. 496,175, filed Oct. 14, 1965, now abandoned, which in turn is a continuation-in-part of Ser. No. 329,223, filed Dec. 9, 1963 and now abandoned; (3) Ser. No. 397,656, filed Sept. 18, 1964, now abandoned, which in turn is a continuation-in-part of Ser. No. 134,161, filed Aug. 28, 1961 and now abandoned; and (4) Ser. No. 397,637, filed Sept. 18, 1964, now abandoned, which in turn is a continuation-in-part of Ser. No. 134,094, filed Aug. 28, 1961 and now abandoned.

This invention relates to α-haloacetanilides which are useful as biocides, particularly phytotoxicants, and to processes for preparing them. This invention further relates to phytotoxic compositions and to methods of controlling or modifying the growth of plant systems.

The term "phytotoxicant" as used herein and in the appended claims means materials having a modifying effect upon the growth of plant systems. Such modifying effects include all deviations from natural development, for example, killing, retardation, defoliation, desiccation, regulation, stunting, tillering, stimulation, dwarfing, and the like. In like manner, "phytotoxic" and "phytotoxicity" are used to identify the growth modifying activity of the compounds and compositions of this invention.

The term "plant system" as used herein and in the appended claims means germinant seeds, emerging seedlings and established vegetation including the roots and above-ground portions.

The novel α-haloacetanilides of this invention are represented by the formulae:

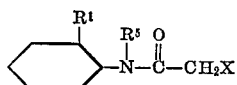

(I)

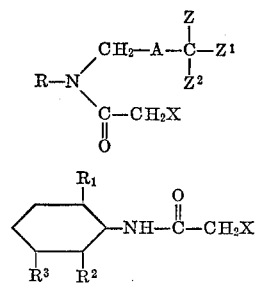

(II)

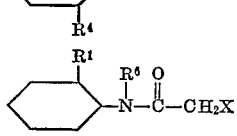

(III)

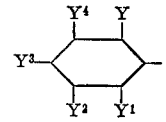

(IV)

wherein R is alkyl having a maximum of 18 carbon atoms, or phenyl of the structure $$\begin{array}{c} Y^4 \quad Y \\ Y^3 \underset{Y^2 \quad Y^1}{\diagdown} \end{array}$$

with Y and $Y^1$ being hydrogen, alkyl or alkoxy having a maximum of 10 carbon atoms, and $Y^2$, $Y^3$, and $Y^4$ being hydrogen, halogen, or alkyl having a maximum of 10 carbon atoms, A is oxygen or sulfur, X is chlorine, bromine, or iodine, and Z, $Z^1$ and $Z^2$ are hydrogen, alkyl, alkenyl, alkynyl, alkoxy or polyalkoxy having from 1 to 18 carbon atoms, aryl having from 6 to 24 carbon atoms, heterocyclyl having a maximum of 24 carbon atoms and from 1 to 3 hetero atoms, or two of Z groups are combined to form a bivalent alkylene radical having from 2 to 6 carbon atoms. One or more of the Z groups can be provided with non-interfering substituents including halogen, hydroxy, alkoxy, nitro, dialkylamino, carbalkoxy, keto groups and the like. Unless otherwise indicated, "alkyl" is used generically to include primary, secondary and tertiary alkyl groups;

$R^1$ is tertiary alkyl of not less than 4 and a maximum of 10 carbon atoms, $R^2$ is hydrogen, halogen, alkyl of not more than 8 carbon atoms or alkoxy of not more than 4 carbon atoms, $R^3$ is hydrogen, primary or secondary alkyl of not more than 6 carbon atoms, chloride or nitro, provided that one and not more than one of $R^2$ and $R^3$ is always hydrogen unless $R^2$ is primary or secondary alkyl in which case $R^3$ is as defined above and further provided that $R^2$ is primary or secondary alkyl when $R^3$ is chloride or nitro.

$R^4$ is alkyl of not more than 8 carbon atoms, $R^5$ is primary or secondary alkyl, alkenyl, alkoxyalkyl or alkynyl, and of not more than 6 carbon atoms, $R^6$ is primary alkyl, alkenyl or alkynyl, and of not more than 4 carbon atoms, and X is chlorine, bromine or iodine.

Representative compounds of the present invention include those in which the groups of the above formulae have the following identities:

R—cyclohexyl, phenyl, aryl, methyl, ethyl, propyl, isopropyl, n-butyl, primary isobutyl, secondary isobutyl, tertiary butyl, n-amyl, branch chain amyls, and the normal and branched hexyls, heptyls, octyls, nonyls, and decyls;

Y and $Y^1$—hydrogen and the alkyl groups of R, methoxy, propoxy, butoxy, pentyloxy, heptyloxy, nonyloxy;

$Y^2$, $Y^3$, and $Y^4$—hydrogen, chlorine, bromine, iodine, fluorine, and the alkyl groups of R; and Z, $Z^1$, and $Z^2$—hydrogen, methyl, ethyl, propyl, isopropyl, n-butyl, primary isobutyl, secondary isobutyl, tertiary butyl, the normal and branched amyls, hexyls, heptyls, octyls, nonyls, decyls, dodecyls, tetradecyls, hexadecyls and octadecyls; chloromethyl, bromopropyl, iodobutyl, fluorohexyl, hydoxyethyl, dihydoxypropyl; the alkoxy, alkenyl and alkynyl groups corresponding to the above-enumerated alkyl groups; phenyl, tolyl, naphthyl; ethylene, trimethylene, tetramethylene; furfuryl, thiofuranyl, pyrrolyl, thiazolyl, pyranyl, oxazinyl, triazinyl, and the like;

$R^1$—tertiary butyl, tertiary amyl, 1,1,2-trimethylpropyl, 1,1-dimethylbutyl, 1,1-dimethylamyl, 1,1,2-trimethylbutyl, 1,1,3-trimethylbutyl, 1,1,3,3-tetramethylbutyl, 1,1,2,3-tetramethylbutyl, 1,1,2,2-tetramethylbutyl and 1,1-dimethyloctyl;

$R^2$—H, Cl, F, Br, I, alkyl such as methyl, ethyl, n-propyl, isopropyl, n-butyl, isobutyl, secondary butyl, tertiary butyl, n-amyl n-hexyl, n-heptyl, n-octyl, and the various homologs and isomers of alkyl of not more than 8 carbon atoms; and alkoxy such as methoxy, ethoxy, n-propoxy, isopropoxy, n-butoxy, secondary butoxy and tertiary butoxy;

$R^3$—H, Cl, nitro and the primary and secondary alkyl above for $R^2$ having a maximum of 6 carbon atoms;

$R^4$—the alkyl groups under $R^2$ above;

$R^5$—the primary and secondary alkyl of $R^2$ having a maximum of 6 carbon atoms, 2-methoxyethyl, 2-ethoxyethyl, 3-methoxypropyl, 3-ethoxypropyl, 3-isopropoxypropyl, 4-methoxybutyl, vinyl, allyl, crotyl, methallyl, ethynyl, 1-propynyl, 2-propynyl, 1-pentynyl and 3-hexynyl;

$R^6$—methyl, ethyl, n-propyl, n-butyl, isobutyl, allyl, vinyl, crotyl, methallyl, ethynyl, 1-propynyl, 2-propynyl and 2-butynyl.

The novel compounds of Formula I are prepared by an alcoholysis in general accordance with the equation

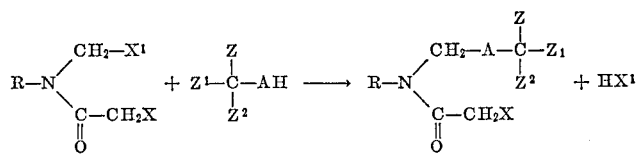

wherein R, X, Z, $Z^1$, and $Z^2$ and A are as defined above and $X^1$ is a halogen, the reaction is preferably conducted in the presence of an acid binding agent. The amide starting materials used in this preparation are conveniently obtained by the addition of a haloacyl halide to N-methylene amines as described in application Ser. No. 329,279, filed Dec. 9, 1963, now abandoned.

The α-haloacetanilides of Formulae II, III and IV can be prepared by haloacetylation of suitable N-substituted and ortho-substituted aromatic amines, which may be prepared for example, by the process disclosed in applications Ser. No. 824,488 and Ser. No. 824,455, filed July 2, 1959, now both abandoned, from a primary aromatic amine and a branch-chain olefin. The haloacetylating agent is preferably either a haloacetic anhydride, such as chloroacetic anhydride, or a haloacetyl halide, such as chloroacetyl chloride, bromoacetyl bromide, or the like.

These compounds are useful as herbicides, fungicides, insecticides, nematocides, algaecides, bactericides, bacteriostats, and fungistats; however, the great bulk of the compounds are primary useful as herbicides, especially pre-emergent herbicides, and at low rates of application, as post-emergent herbicides.

The invention will be more clearly understood from the following detailed description of specific examples thereof:

Example 1

This example describes the preparation of 2'-tertbutyl-2-chloro-N-methoxymethyl-6'-methylacetanilide. 20 g. of 2'-tert-butyl-2-chloro-N-chloromethyl-6'-methylacetanilide was placed in a beaker and 100 ml. of trimethylamine in methanol (25% solution) was added. Immediate exothermal recation occurred, and the product which separated was water insoluble and hence not a quaternary salt. The methanol and excess trimethylamine were evaporated, water was added to the residue and the oil layer was extracted with hexane. The hexane layer containing the desired product was placed in a refrigerator and a crystalline product separated. The solid was filtered off, washed with cold hexane, and air dried. This white solid melted sharply at 77–78° C. and weighed 12.5 g. An elemental analysis of this product yielded the following results:

Calc'd for $C_{15}H_{22}ClNO_2$, percent: C, 63.5; H, 7.8; Cl, 12.5. Found: C, 63.3; H, 7.9; Cl, 12.5.

Example 2

This example describes the preparation of 2-bromo-2'-tert-butyl-N-methoxymethyl-6'-methylacetanilide. About 1414 g. (7 moles) of bromoacetyl bromide and a quart of dry toluene were introduced into a 5-liter 4-neck flask, and about 1200 g. (6.86 moles) of 2-tert-butyl-6-methyl-N-methyleneaniline were gradually added during a one-hour period while maintaining the temperature within the range of 30–40° C. The reaction mixture was maintained at a temperature of approximately 45° C. for one hour and allowed to stand for approximately 16 hours at room temperature. The resulting turbid mixture was heated to about 40° C., transferred to a separatory funnel and added in six increments to 750 g. of 50% triethylamine in methanol with stirring, keeping the temperature between 35 and 40° C. The reaction mixture was stirred for an additional hour at a temperature of 45–50° C. and then cooled. The mixture was then washed with 5 portions of water (about 1500 ml. each) and about a pint of chlorobenzene was added to facilitate separation of the heavy product layer. The bulk of the solvent was removed from the product layer by distillation at 20 mm. pressure and completed at 0.2 mm. pressure and 60° C. The mixture was cut back with 1 liter of toluene and a liter of methyl cyclohexane, and cooled to —40° by surrounding the flask with Dry Ice. A portion of the resultant solidified mass was isolated, dissolved in hexane, chilled with Dry Ice, filtered, washed with cold hexane, and air dried. The product thus obtained was a cream-colored solid melting at 51.5–52° C. and having the following analysis:

Calc'd for $C_{15}H_{22}BrNO_2$: C, 54.88; H, 6.76; Br, 24.37. Found: C, 54.91; H, 6.75; Br, 24.43.

EXAMPLE 3

This example describes the preparation of 2'-tert-butyl-2-iodo-N-methoxymethyl-6'-methylacetanilide. 105 g. of iodoacetyl chloride and 100 g. of dry toluene were placed in a 1-liter 4-neck flask. The flask was purged with dry nitrogen, and with stirring and external cooling, 87.5 g. (0.5 mole) of 2-tert-butyl-6-methyl-N-methyleneaniline was added to the flask in incremental amounts over a period of 20 minutes keeping the temperature below 20° C. The reaction mixture was warmed to 50° C., cooled to 15° C., and to the flask was added 53 g. of triethylamine in 100 ml. of dry methanol, keeping the temperature below 15° C. The methanol and triethylamine were added over a period of one-half hour. Little heat was evolved during this addition. The flask and contents were heated over a 45-minute period at about 50° C. The flask and contents were cooled and then washed with three 500 ml. portions of water. The oil layer was removed from the water and solvent evaporated at 30 mm. to a pot temperature of 60° C. Heating was continued for an additional half hour at 60° C. and a vacuum of 0.5–0.15 mm. pressure. A small sample was taken from the residual material in the flask and dissolved in a toluene/heptane mixture and the solution was placed in Dry Ice. No precipitate was obtained. The balance of the residual material in the flask was dissolved in 300 ml. of benzene and 250 ml. of hexane was added. This solution was filtered to remove a small amount of insoluble material. The filtrate was again evaporated under vacuum. A thick brown oil was obtained, weighing 168 g. An elemental analysis of this product yielded the following results:

Carbon, 49.5%; hydrogen, 6.2%; iodine, 33.8%.

EXAMPLE 4

This example describes the preparation of N-butoxymethyl-2'-tert-butyl-2-chloro-6'-methylacetanilide. 60 g. of chloroacetyl chloride and 100 g. of n-heptane were placed in a 1-liter 4-neck flask. Over a ten-minute period and with stirring was added to the flask 87.5 g. (0.5 mole) of 2-tert-butyl-6-methyl-N-methyleneaniline and the temperature rose from 20° C. to 75° C. The flask contents were heated briefly to 103° C. pot temperature and allowed to cool to 30° C. using a drying tube on the condenser to exclude moisture. Next 296 g. (4 moles) of n-butanol containing 60 g. of triethylamine was poured into the flask and the mixture was stirred for fifteen minutes. During this period the temperature rose to 35° C. and some solid was evident. The reaction mixture was poured into 750 ml. of cold water, was mixed by shaking the flask, and an oil layer separated. The solvent was removed from the oil layer by distillation. When about one-half of the solvent had been removed, a voluminous precipitate of triethylamine hydrochloride fine needles formed and was removed by filtration. The filtrate was vacuum distilled to a pot temperature of 75° C. at 25 mm. pressure. The residual product weighed 175 g. and to this product was added 200 ml. of toluene. The flask containing the toluene solution of the product was placed in a deep freeze overnight. The next morning the precipitate appearing in the flask was removed from the toluene solution by filtration and the precipitate was washed with n-heptane. The filtrate was evaporated under 10 mm. pressure to a pot temperature of 105° C. Weight of the recovered product was 156 g. The product was turbid and 200 ml. of heptane and 5 g. of activated carbon was added to the product. The carbon was removed by filtration and the filtrate containing the dissolved product was evaporated under vacuum, finishing the evaporation at 0.07 mm. pressure and 130° C. pot temperature to provide a translucent, dark amber oil having a refractive index of $n_D^{25}$ 1.5252. Upon vacuum distillation using a Vigreux column, the main fraction distilled over as a colorless oil, boiling between 150° and 155° C. at 0.07 mm. mercury and having a refractive index of $n_D^{25}$ 1.5210. Infrared analysis confirmed the molecular analysis, and the elemental analysis gave the following results:

Calc'd for $C_{18}H_{28}ClNO_2$, percent: C, 66.4; H, 8.7; Cl, 10.9. Found: C, 66.1; H, 8.5; Cl, 10.9.

EXAMPLE 5

This example describes the preparation of 2-chloro-2',6'-diethyl-N-(methoxymethyl)acetanilide. About 182 moles (206 g.) of chloroacetyl chloride and about 210 g. of benzene were introduced into a 2-liter, 4-neck flask, and about 293 g. (1.82 moles) of 2,6-diethyl-N-methyleneaniline was gradually added with agitation over a 25-minute period. The exothermic reaction raised the temperature of the reaction mixture to about 90° C. after cooling the mixture to about 35° C., about 250 ml. of dry methanol were added. With the reaction mixture under reflux, an excess (approximately 190 g.) of triethylamine was added dropwise. During this addition the temperature of the mixture rose to about 70° C. This temperature was maintained for about 10 minutes and then reduced to approximately 30° C. After cooling, the mixture was washed with two 500 ml. portions of water. The product was in a heavy oily layer which was stripped of solvent by vacuum distillation with a terminal pot temperature of about 95° C. The distillation residue was then dissolved in 500 ml. of trimethylpentane and crystalized therefrom by chilling with Dry Ice. The product thus obtained had a melting point (corrected) of 38.5–39.5° C. and the following analysis:

Calculated: C, 62.33; H, 7.47; Cl, 13.14; N, 5.19. Found: C, 62.20; H, 7.50; Cl, 13.31; N, 5.21.

EXAMPLES 6 THROUGH 38

The following compounds were also prepared by substantial repetition of the general procedures set forth in the foregoing examples:

(6) 2' - tert-butyl - 2 - chloro-N-hexoxymethyl - 6' - methylacetanilide.

(7) N-(allyloxymethyl) - 2 - bromo - 2' - tert-butyl-6'-methylacetanilide.

(8) 2'-tert-butyl - 2 - chloro - 6' - methyl-N-(2-propynoxymethyl)acetanilide.

(9) 2-bromo - 2' - tert-butyl - 6' - methyl-N-(2-propynoxymethyl)acetanilide.

(10) 2' - tert-butyl - 2 - chloro-N-(2-methoxyethoxymethyl)-6'-methylacetanilide.

(11) 2-bromo-2'-tert-butyl-N-[2-(2 - methoxyethoxy)-ethoxy]methyl-6'-methylacetanilide.

(12) 2-bromo-2'-tert-butyl - N - (2,3 - dihydroxypropoxymethyl)-6'-methylacetanilide.

(13) 2'-tert-butyl-2-chloro - N - (1,3-dichloro-2-propoxymethyl)-6'-methylacetanilide.

(14) 2-bromo-2'-tert-butyl - N - (1,3-dibromoisopropoxymethyl)-6'-methylacetanilide.

(15) 2-bromo-2'-tert-butyl - N - (2,3-dibromoallyloxymethyl)-6'-methylacetanilide.

(16) 2-bromo-2'-tert-butyl - N - (furfuryloxymethyl)-6'-methylacetanilide.

(17) 2'-tert-butyl-2-chloro - N - methoxymethyl-4',6'-dimethylacetanilide.

(18) 2'-tert-butyl - 2 - chloro - N - methoxymethyl-6'-methoxyacetanilide.

(19) 2-chloro-2'-tert-amyl - N - methoxymethyl - 6'-methylacetanilide.

(20) 2 - bromo-2',6'-diethyl-N-(methoxymethyl)acetanilide.

(21) 2 - iodo - 2',6' - diethyl-N-(methoxymethyl)acetanilide.

(22) 2-chloro-2',6'-diethyl - N - (ethoxymethyl)acetanilide.

(23) 2-chloro-2',6'-diethyl - N - (allyloxymethyl)acetanilide.

(24) 2-chloro-2',6'-dimethyl - N - (isobutoxymethyl)-acetanilide.

(25) 2-chloro-N-(methoxymethyl) - 2' - methylacetanilide.

(26) 2-chloro-N-methoxymethyl - N - (1,1,3,3-tetramethylbutyl)acetamide.

(27) 2-bromo - 2' - tert - butyl - N - [(2,2,2-trifluoroethoxy)methyl]-o-acetotoluidide.

(28) 2' - tert-butyl-2-chloro-N-(methoxymethyl)acetanilide.

(29) 2-chloro-N-(methoxymethyl)acetanilide.

(30) 2-bromo-N-(2-tert-butyl - 6 - methylcyclohexyl)-N-(methoxymethyl)-acetamide.

(31) 2-chloro-2',6'-dimethyl - N - (methoxymethyl) acetanilide.

(32) 2-chloro-2',6'-diethyl - N - (isopropoxymethyl) acetanilide.

(33) 2-chloro-2',6'-dimethyl - N - (isopropoxymethyl) acetanilide.

(34) 2-bromo-2'-tert-butyl - 6' - ethyl - N - (methoxymethyl)acetanilide.

(35) 2-chloro-2',6'-diethyl - N - [(1-methylheptyloxy)methyl]acetanilide.

(36) 2 - bromo-2'-tert-butyl-6'-methoxy-N-(methoxymethyl)acetanilide.

(37) 2-chloro - 2',6' - diethyl - N - (ethanonethoxymethyl)acetanilide.

(38) 2 - chloro-2',6'-diethyl-N-[(2-isopropoxyethoxy)methyl]acetanilide.

Example 39

In this example, 2'-tert-butyl-2,6'-dichloroacetanilide was prepared by heating 10.4 g. (0.1 mole) of 2-tert-butyl-6-chloroaniline and 29 ml. of chloroacetic anhydride under reflux for 10 minutes. Thereafter, 100 ml. of water was added to the reaction mixture and the solvents removed by distillation. The residue was cooled to effect crystallization of the product which was recovered, washed with water, and crystallized from dilute methanol to obtain 19 g. of the 2'-tert-butyl-2,6'-dichloroacetanilide which is a colorless solid having a melting point of 131.5–2° C.

Example 40

Into a 1-liter reaction flask were placed 0.2 mole of 2-tert-butyl-5-methylaniline, 400 g. of benzene and 40 g. of pyridine. Thereafter, 0.22 mole of chloroacetyl chloride was added slowly with stirring over a period of 30 minutes while maintaining the temperature at 12 to 23° C. Upon completion of the addition of the chloroacetyl chloride the reaction mixture was stirred for an additional 5 minutes. At the end of this time, the reaction mixture was diluted with 250 ml. of water. The oil layer formed was separated and washed first with 300 ml. of 3% hydrochloric acid and then twice with warm water. The solvents were removed by evaporation under a hood and the syrup obtained cut-back with 200 ml. of heptane. The heptane solution was cooled to effect crystallization of the product. Recrystallization from dilute methanol gave 41 g. of 2'-tert-butyl-2-chloro-5'-methylacetanilide which is a light-tan colored material having a melting point of 102–5° C. Analysis of this product was found to be 15.22% chlorine as compared with the calculated value of 14.79% chlorine.

Example 41

Into a reaction flask were placed 0.2 mole of 2-tert-butyl-5-methylaniline, 400 g. of benzene and 40 g. of pyridine. Thereafter, 0.22 mole of bromoacetyl bromide was added with stirring over a period of 30 minutes while maintaining the temperature at 5 to 15° C. Upon completion of the addition of the bromoacetyl bromide, the reaction mixture was stirred an additional 15 minutes. At the end of this time, the reaction mixture was diluted with 250 ml. of water. The oil layer formed was separated and washed with 200 ml. of warm water. The reaction mixture was then diluted with an equal volume of heptane and cooled to effect crystallization of the product. Recrystallization of the product gave 36 g. of 2-bromo-2'-tert-butyl-5'-methylacetanilide which is a cream-colored solid material having a melting point of 133–5° C. Analysis of the product was found to be 28.30% bromine as compared with the calculated value of 28.12% bromine.

Example 42

In this example, 2'-tert-butyl-2-chloro-6'-methyl-5'-nitroacetanilide was prepared by nitration of 2'-tert-butyl-2-chloro-6'-methylacetanilide which was prepared from 2-tert-butyl-6-methylaniline and chloroacetyl chloride. In preparation of the 2'-tert-butyl-2-chloro-6'-methylacetanilide, 163 g. (1.0 mole) of 2-tert-butyl-6-methylaniline, 100 g. of potassium carbonate, 100 ml. of water, 400 g. of ice, 200 ml. of benzene, and 100 ml. of diethyl ether were placed in a 2-liter reaction flask. Thereafter, 120 g. (1.05 mole) of chloroacetyl chloride in 100 ml. of benzene was added slowly to the reaction flask with stirring over a period of 35 minutes. After about ⅔ of the addition of the chloroacetyl chloride was completed during which time the temperature was maintained from 4–6° C., 200 ml. of benzene was added to the reaction flask and the addition of the chloroacetyl chloride continued with the temperature maintained at 22° C. Thereafter, the oil phase in the reaction mixture was separated, washed with 1 liter of warm water, diluted with 250 ml. of water, and evaporated under a hood to remove the solvents. The residue was taken up in 75% methanol and crystallization effected to obtain the 2'-tert-butyl-2-chloro-6'-methylacetanilide having a melting point of 113.8–114.2° C.

In the nitration step, 84 g. of the 2'-tert-butyl-2-chloro-6'-methylacetanilide was pulverized and placed in a 1-liter flask with 68 ml. of acetic acid and 85 ml. of acetic anhydride. After cooling the contents of the flask to −10° C., 18 ml. of 90% nitric acid in 55 ml. of acetic acid was added slowly over a period of 40 minutes while maintaining the temperature at −14 to −10° C. Upon completion of the addition of the nitric acid, the contents of the flask were stirred for a period of 2 hours at a temperature of −10° C. and then 1 hour at a temperature in the range of from −10 to 0° C. At the end of this time, the reaction mixture was cooled with ice and the solid material formed separated and recovered by filtering and washing with water. The product was crystallized twice from 90% methanol to obtain 28 g. of the 2'-tert-butyl-2-chloro-6'-methyl-5'-nitroacetanilide which is a cream-colored solid having a melting point of 164–5° C. Analysis of this product was found to be 12.51% chlorine as compared with the calculated value of 12.45% chlorine. The substitution of the nitro group on the aromatic ring in the 5 position was confirmed by inspection of the infrared spectrum.

Example 43

In this example 2-bromo-2'-tert-butyl-5'-chloro-6'-methylacetanilide was prepared from bromoacetyl bromide and 2-tert-butyl-5-chloro-6-methylaniline which was prepared by alkylation of 3-chloro-2-methylaniline with isobutene using a clay catalyst. In the bromoacetylation step, 99 g. (1.5 mole) of 2-tert-butyl-5-chloro-6-methylaniline was dissolved in 400 ml. of benzene and the mixture heated to boiling under reflux. Then, 125 g. of bromoacetyl bromide was added over a period of about 10 minutes. Thereafter, the reaction mixture was heated for a period of 17 hours. At the end of this time the reaction mixture was cooled and the solid precipitate which formed was recovered by filtration. The product was crystallized from methanol to obtain 95 g. of the 2-bromo-2'-tert-butyl-2'-chloro-6'-methylacetanilide which is an off-white solid having a melting point of 178–9° C. Analysis of this product was found to be 25.28% bromine as compared with the calculated value of 25.08% bromine.

Example 44

Into a 2-liter reaction flask were placed 140 g. (0.78 mole) of 2-tert-butyl-6-methoxyaniline, 400 g. of benzene, 100 g. of potassium carbonate, and 375 ml. of water. Thereafter, 180 g. of bromoacetyl bromide dissolved in 100 ml. of benzene was added with stirring to the reaction flask surrounded by an ice bath over a period of 1.25 hours while maintaining the temperature at 5–15° C. Upon completion of the addition of the bromoacetyl bromide, the reaction mixture was stirred for an additional 10 minutes. At the end of this time the reaction mixture was heated to 40° C. with stirring and maintained at that temperature for ½ hour. At the end of this time, the reaction mixture was chilled to 10° C. and filtered. The filter cake was recovered and washed with heptane followed by several washings with water. The filter cake was air dried to obtain 216 g. of 2'-tert-butyl-2-bromo-6'-methoxyacetanilide as a white powder having a melting point of 147.5–148.5° C. Analysis of the product was found to be 26.71% bromine as compared with a calculated value of 26.61% bromine.

Following substantially the same procedure as in the foregoing Examples 39 through 44 and using the appropriate reactants, the following compounds are prepared.

Example No.:
- 45 2'-tert-butyl-2,5'-dichloro-6'-methylacetanilide
- 46 2'-tert-butyl-2-chloro-5',6'-dimethylacetanilide
- 47 2-chloro-5',6'-dimethyl-2'-(1,1-dimethylpropyl)acetanilide
- 48 2-bromo-2'-tert-butyl-5',6'-dimethylacetanilide
- 49 2-tert-butyl-2-iodo-5',6'-dimethylacetanilide
- 50 2-chloro-5',6'-dimethyl-2'-(1,1-dimethylbutyl)acetanilide
- 51 2-bromo-5',6'-dimethyl-2'-(1,1-dimethylbutyl)acetanilide
- 52 2'-tert-butyl-2-chloro-6'-methylacetanilide
- 53 2'-tert-butyl-2-chloro-6'-ethylacetanilide
- 54 2'-tert-amyl-2-chloro-6'-methylacetanilide
- 55 2'-tert-butyl-2-chloro-6'-isopropylacetanilide
- 56 2-bromo-2'-tert-butyl-6'-methylacetanilide
- 57 2'-tert-amyl-2-bromo-6'-methylacetanilide
- 58 2-bromo-2'-(1,1-dimethylbutyl)-6'-methylaniline
- 59 2-chloro-2'-methyl-6'-(1,1,3,3-tetramethylbutyl)acetanilide
- 60 2-chloro-2',6'-di-tert-butylacetanilide
- 61 2-bromo-2'-di-tert-butylacetanilide
- 62 2'-tert-butyl-2-iodo-6'-methylacetanilide
- 63 2'-tert-butyl-6'-ethyl-2-iodoacetanilide
- 64 2-bromo-2'-tert-butyl-6'-isopropylacetanilide
- 65 2-chloro-2'-(1,1-dimethylbutyl)-6'-methylacetanilide
- 66 2-bromo-2'-tert-butyl-6'-ethylacetanilide
- 67 2'-tert-butyl-2-chloro-6'-methoxyacetanilide
- 68 2'-tert-butyl-2-iodo-6'-methoxyacetanilide Example 69

In this example, 2'-tert-butyl-2-chloro-N,6'-dimethylacetanilide was prepared by chloroacetylation of 2-tert-butyl-N,6-dimethylaniline which was prepared from 2-tert-butyl-6-methylaniline and methyl iodide. In the first step, 284 g. (1.74 mole) of 2-tert-butyl-6-methylaniline, 284 g. (2 moles) of methyl iodide, and 200 g. of acetonitrile were heated together under reflux for a period of 48 hours while maintaining the temperature in the range of from 75° C. to 80° C. At the end of this time, 250 ml. of water was added and the mixture distilled under vacuum to remove the excess methyl iodide and acetonitrile. Thereafter, 80 g. of sodium hydroxide in 200 ml. of water was added and the mixture thoroughly agitated. Upon standing, two phases formed and the oil layer was removed and washed once with water. This material was distilled to obtain 291 g. of an impure 2-tert-butyl-N,6-dimethylaniline which boiled at 110.5–112.5° C. Upon further purification by distillation, 116 g. of the 2-tert-butyl-N,6-dimethylaniline was obtained boiling at 110–113° C./10.6 mm. Hg.

In the chloroacetylation step, 112 g. (0.63 mole) of 2-tert-butyl-N,6-dimethylaniline, 150 ml. of benzene, and 221 g. (0.65 mole) of 50% chloroacetic anhydride in chloroform were mixed together in a reaction flask and heated up to a temperature of about 80° C. over a period of 5 minutes. Heating of the contents in the reaction flask was continued overnight while maintaining the temperature about 80° C. At the end of this time, the reaction mixture was diluted with 250 ml. of water and the solvents removed by distillation. Since crystallization of the product did not take place, this mixture was washed twice with water and once with dilute potassium carbonate solution and distilled to obtain 108 g. of the 2'-tert-butyl-2-chloro-N,6'-dimethylacetanilide boiling at 165–70° C./4.2 mm. Hg. The product was further purified by redistillation to obtain 101 g. of product boiling at 146–48° C./0.9 mm. Hg and having a refractive index $n_D^{25}$ 1.5397. The product is a stable, colorless liquid and analyzed 13.78% chlorine as compared with a calculated value of 13.97% chlorine.

Following the general procedure of Example 69 and utilizing appropriate reactants, the following compounds were prepared:

Example No.:
- 70 2'-tert-butyl-2-chloro-N-ethyl-6'-methylacetanilide
- 71 2'-tert-butyl-2-chloro-N-isopropyl-6'-methylacetanilide
- 72 2'-tert-butyl-2-chloro-N-ethoxyethyl-6'-ethylacetanilide
- 73 N-allyl-2'-tert-butyl-2-chloroacetanilide
- 74 2'-tert-butyl-2-chloro-N-n-propylacetanilide
- 75 2'-tert-butyl-2-chloro-N-methylacetanilide
- 76 2'-tert-butyl-2-chloro-N-ethylacetanilide
- 77 2'-tert-butyl-N-isobutyl-2-chloroacetanilide
- 78 2'-tert-butyl-N-(2-propynyl)acetanilide
- 79 2'-tert-butyl-2-chloro-N-isobutyl-6'-methylacetanilide
- 80 N-allyl-2'-tert-butyl-2-chloro-6'-methylacetanilide A good grade of top soil was placed in aluminium pans and compacted to a depth of ⅜ to ½ inch from the top of the pan. On the top of the soil was placed a predetermined number of seeds of various plant species. In the surface applications the seeds were covered by overfilling the pan with soil and striking it level. The measured amount of chemical in a suitable solvent or as a wettable powder was applied to this surface. In the soil incorporation treatments the soil required to level fill the pans after seeding was weighed into a pan, a known amount of the chemical applied in a solvent or as a wettable powder, the soil thoroughly mixed and used as a cover layer for seeded pans. After treatment the pans were moved into a greenhouse bench where they were watered from below as needed to give adequate moisture for germination and growth.

Approximately 14 days after seeding and treating, the plants were observed and the results recorded. The phytotoxic rating was obtained by means of a fixed scale based on the average percent germination of each seed lot. The ratings are defined as follows:

| Average percent germination | Numerical scale | Phytotoxic activity |
|---|---|---|
| 76–100 | 0 | No phytotoxicity. |
| 51–75 | 1 | Slight phytotoxicity. |
| 26–50 | 2 | Moderate phytotoxicity. |
| 0–25 | 3 | Severe phytotoxicity. |

The pre-emergence herbicidal activity of the α-haloacetamides of formula I are recorded in Table I for various application rates in both surface and soil-incorporated applications. In the following tables, the various seeds are represented by letters as follows:

A General Grass    K Pig Weed
B General Broadleaf    L Soy Bean
C Morning Glory    M Wild Buckwheat
D Wild Oats    N Tomato
E Brome Grass    O Sorghum
F Rye Grass    P Cotton
G Radish    Q Corn
H Sugar Beet    R Barnyard
I Foxtail    S Rice
J Crab Grass Individual injury ratings for each plant type are reported. The total injury rating for all grass plants and the total injury rating for all broadleaf plants are also reported. In the column entitled "Comments," (1) indicates surface application of the herbicide and (2) indicates its incorporation into the soil. The data in Table I illustrate the outstanding general and selective phytotoxic activity of the α-haloacetamides under consideration.

TABLE I.—PRE-EMERGENCE HERBICIDAL ACTIVITY

| Compound of example | Rate, lb./acre | C | D | E | F | G | H | I | J | K | L | M | N | O | P | Q | R | S | Grass | Broadleaf | Comments |
|---|---|---|---|---|---|---|---|---|---|---|---|---|---|---|---|---|---|---|---|---|---|
| No. 1 | 1 | 3 | 3 | 3 | 3 | 2 | 3 | 3 | 3 | 3 | 2 | 2 | 3 | 3 | 2 | 3 | 3 | 3 | 27 | 20 | (2) |
|  | .05 | 1 | 2 | 1 | 3 | 1 | 3 | 3 | 3 | 2 | 0 | 2 | 3 | 1 | 0 | 1 | 3 | 0 | 17 | 12 | (2) |
| No. 2 | 1 | 3 | 3 | 3 | 3 | 3 | 2 | 3 | 3 | 3 | 1 | 1 | 2 | 3 | 1 | 3 | 3 | 3 | 27 | 16 | (2) |
|  | .05 | 0 | 2 | 3 | 3 | 0 | 0 | 2 | 3 | 1 | 1 | 0 | 0 | 3 | 0 | 0 | 3 | 3 | 22 | 2 | (2) |
| No. 3 | 1 | 1 | 3 | 3 | 3 | 0 | 2 | 3 | 3 | 3 | 0 | 1 | 2 | 3 | 0 | 3 | 3 | 3 | 27 | 9 | (2) |
|  | ¼ | 0 | 3 | 3 | 3 | 0 | 1 | 3 | 3 | 3 | 1 | 0 | 2 | 3 | 0 | 2 | 3 | 3 | 26 | 7 | (2) |
| No. 4 | 1 | 0 | 3 | 3 | 3 | 2 | 2 | 3 | 3 | 3 | 0 | 2 | 2 | 3 | 0 | 3 | 3 | 3 | 27 | 11 | (2) |
|  | ¼ | 1 | 3 | 3 | 3 | 1 | 1 | 3 | 3 | 3 | 1 | 0 | 0 | 3 | 0 | 1 | 3 | 3 | 25 | 7 | (2) |
| No. 5 | 1 | 1 | 3 | 3 | 3 | 0 | 3 | 3 | 2 | 3 | 0 | 3 | 3 | 3 | 0 | 1 | 3 | 3 | 25 | 13 | (2) |
|  | .05 | 0 | 1 | 1 | 1 | 0 | 1 | 3 | 3 | 2 | 0 | 3 | 1 | 1 | 0 | 0 | 2 | 0 | 12 | 7 | (2) |
| No. 6 | 5 | 2 | 3 | 3 | 3 | 1 | 2 | 3 | 3 | 3 | 1 | 1 | 1 | 3 |  |  |  |  | 18 | 11 | (1) |
|  | 1 | 0 | 0 | 0 | 0 | 0 | 0 | 3 | 3 | 3 | 0 | 0 | 0 | 2 | 0 | 0 | 2 | 0 | 10 | 0 | (2) |
| No. 7 | 5 | 2 | 3 | 3 | 3 | 2 | 3 | 3 | 3 | 3 | 0 | 2 | 2 | 3 |  |  |  |  | 18 | 14 | (1) |
|  | .05 | 2 | 3 | 3 | 3 | 0 | 0 | 3 | 3 | 1 | 0 | 0 | 0 | 3 | 0 | 0 | 3 | 2 | 23 | 3 | (2) |
| No. 8 | 1 | 3 | 3 | 3 | 3 | 3 | 3 | 3 | 3 | 3 | 0 | 3 | 3 | 3 | 1 | 3 | 3 | 3 | 27 | 18 | (2) |
|  | .05 | 0 | 2 | 3 | 3 | 0 | 0 | 3 | 3 | 2 | 0 | 0 | 1 | 3 | 0 | 0 | 3 | 2 | 22 | 3 | (2) |
| No. 13 | 5 | 3 | 3 | 3 | 3 | 3 | 3 | 3 | 3 | 3 | 3 | 3 | 3 | 3 |  |  |  |  | 18 | 21 | (1) |
|  | 1 | 1 | 3 | 3 | 3 | 1 | 0 | 3 | 3 | 3 | 1 | 1 | 1 | 3 | 0 | 0 | 3 | 3 | 24 | 8 | (1) |
| No. 16 | 5 | 2 | 3 | 3 | 3 | 2 | 2 | 3 | 3 | 3 | 3 | 2 | 3 | 3 | 0 | 2 | 3 | 3 | 26 | 17 | (2) |
|  | ¼ | 0 | 3 | 2 | 3 | 2 |  | 3 | 3 | 3 | 1 | 0 | 2 | 3 | 0 | 0 | 3 | 1 | 21 | 8 | (2) |
| No. 25 | 1 | 0 | 2 | 3 | 3 | 0 | 0 | 3 | 3 | 3 | 0 | 0 | 0 | 3 | 0 | 0 | 3 | 3 | 23 | 5 | (2) |
|  | .05 | 0 | 0 | 0 | 1 | 0 | 0 | 3 | 3 | 2 | 0 | 0 | 0 | 1 | 0 | 0 | 3 | 1 | 12 | 2 | (2) |
| No. 10 | 1 | 2 | 3 | 3 | 3 | 2 | 3 | 3 | 3 | 3 | 2 | 1 | 3 | 3 | 1 | 3 | 3 | 3 | 27 | 17 | (2) |
|  | .05 | 1 | 2 | 3 | 3 | 0 | 1 | 3 | 3 | 2 | 0 | 0 | 1 | 3 |  |  | 0 | 3 | 22 | 4 | (2) |
| No. 27 | 1 | 0 | 3 | 3 | 3 | 0 | 0 | 3 | 3 | 2 | 0 | 0 | 0 | 3 | 0 | 0 | 3 | 3 | 24 | 2 | (2) |
|  | ¼ | 0 | 1 | 3 | 3 | 0 | 0 | 3 | 3 | 0 | 0 | 0 | 0 | 3 | 0 | 0 | 2 | 2 | 20 | 0 | (2) |
| No. 28 | 1 | 1 | 3 | 3 | 3 | 0 | 2 | 3 | 3 | 3 | 0 | 1 | 1 | 3 | 1 | 1 | 3 | 3 | 25 | 9 | (2) |
|  | ¼ | 0 | 2 | 2 | 2 | 0 | 2 | 3 | 3 | 2 | 0 | 0 | 0 | 3 | 0 | 0 | 3 | 2 | 20 | 4 | (2) |
| No. 29 | 1 | 0 | 0 | 3 | 2 | 0 | 1 | 3 | 3 | 3 | 0 | 1 | 0 | 3 | 0 | 0 | 3 | 3 | 16 | 5 | (2) |
|  | ¼ | 0 | 0 | 0 | 0 | 0 | 0 | 1 | 1 | 1 | 0 | 0 | 2 | 1 | 0 | 0 | 2 | 1 | 6 | 3 | (2) |
| No. 34 | 1 | 2 | 3 | 3 | 3 | 1 | 1 | 3 | 3 | 3 | 0 | 0 | 1 | 3 |  |  |  |  | 18 | 7 | (2) |
|  | .05 | 2 | 0 | 0 | 0 | 3 | 0 | 2 | 3 | 1 | 1 | 0 | 1 | 1 | 2 | 1 | 2 |  | 9 | 13 | (2) |

(1) Surface application.  (2) Incorporated in soil.

The contact activity of representative α-haloacetamides of Formula I was determined in greenhouse tests. The compound to be tested was applied in spray form to plants of a given age of the same grasses and broadleaf plants as used in the above pre-emergence tests; and, the same number of seeds of the same plants were planted in aluminum pans. After the plants were the desired age, each aluminum pan was sprayed with a given volume of a 0.5% concentration solution of the candidate chemical, corresponding to a rate of approximately 10 lbs. per acre. This solution was prepared from an aliquot of a 2% solution of the candidate compound in acetone, a known amount of cyclohexanone-emulsifying agent mix, and sufficient water to make up to volume. The emulsifying agent was a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants were then observed opproximately 14 days later and are reported in Table II.

TABLE II.—CONTACT PHYTOTOXIC ACTIVITY OF α-HALOACETAMIDES

| Compound | General grass | General broadleaf |
|---|---|---|
| Example No. 1 | 3 | 2 |
| Example No. 2 | 1 | 2 |
| Example No. 8 | 2 | 2 |
| Example No. 9 | 1 | 3 |
| Example No. 13 | 1 | 2 |
| Example No. 14 | 1 | 1 |
| Example No. 15 | 1 | 1 |
| Example No. 16 | 1 | 3 |

The pre-emergence phytotoxic activity of α-haloacetanilides of Formula II are recorded in Table III for various application rates of the α-haloacetanilide in both surface and soil incoroprated applications.

TABLE III.—PRE-EMERGENCE PHYTOTOXIC ACTIVITY

| Compound | Rate, lb./acre | A | B | C | D | E | F | G | H | I | J | K | L | M | N | O | Grass | Broadleaf | Comments |
|---|---|---|---|---|---|---|---|---|---|---|---|---|---|---|---|---|---|---|---|
| 2'-tert-butyl-2-chloro-6'-methylacetanilide | 25 | 3 | 3 | 3 | 3 | 3 | 3 | 3 | 3 | 3 | 3 | 3 | 3 | 3 | 3 | 3 | 18 | 21 | (1) |
|  | 5 | 3 | 3 | 3 | 3 | 3 | 3 | 3 | 3 | 3 | 3 | 3 | 3 | 3 | 3 | 3 | 18 | 21 | (2) |
|  | 1 | 3 | 3 | 3 | 3 | 3 | 3 | 3 | 3 | 3 | 3 | 3 | 3 | 3 | 3 | 3 | 18 | 21 | (2) |
|  | 0.3 | 3 | 3 | 3 | 3 | 1 | 2 | 3 | 0 | 1 | 3 | 3 | 3 |  | 3 | 3 | 15 | *13 | (2) |
|  | 0.05 | 2 | 0 | 0 | 0 | 0 | 3 | 0 | 0 | 3 | 3 | 0 |  | 0 | 2 | 0 | 9 | *2 | (2) |
| 2'-tert-butyl-2-chloro-6'-ethylacetanilide | 25 | 3 | 3 | 3 | 3 | 3 | 3 | 3 | 3 | 3 | 3 | 3 | 3 | 3 | 3 | 3 | 18 | 21 | (1) |
|  | 5 | 3 | 3 | 3 | 3 | 3 | 3 | 3 | 3 | 3 | 3 | 3 | 3 |  | 3 | 3 | 18 | *18 | (2) |
|  | 1 | 3 | 3 | 3 | 3 | 3 | 3 | 2 | 3 | 3 | 3 | 3 | 3 |  | 3 | 3 | 18 | *17 | (2) |
|  | 0.3 | 3 | 0 | 1 | 2 | 0 | 3 | 0 | 0 | 3 | 3 | 0 |  | 0 | 0 | 2 | 12 | *4 | (2) |
|  | 0.05 | 2 | 0 | 2 | 0 | 0 | 3 | 0 | 0 | 3 | 3 | 0 |  | 0 | 0 | 0 | 9 | *2 | (2) |
| 2-chloro-2'-(1,1-dimethylpropyl)-6'-methylacetanilide | 5 | 3 | 3 | 3 | 3 | 3 | 3 | 3 | 3 | 3 | 3 | 3 | 3 | 3 | 3 | 3 | 18 | 21 | (1) |
|  | 0.25 | 3 | 1 | 1 | 2 | 2 | 3 | 0 | 1 | 3 | 3 | 3 | 3 | 0 | 1 | 2 | 15 | 9 | (1) |
|  | 0.07 | 2 | 0 | 1 | 0 | 2 | 3 | 0 | 0 | 3 | 3 | 2 | 0 | 0 | 2 | 0 | 11 | 5 | (2) |
| 2'-tert-butyl-2-chloro-6'-isopropylacetanilide | 5 | 3 | 0 | 0 | 3 | 3 | 3 | 0 | 0 | 3 | 3 | 3 | 0 | 0 | 0 | 3 | 18 | 3 | (2) |
|  | 1 | 2 | 1 | 1 | 0 | 0 | 3 | 0 | 3 | 3 | 3 | 3 | 0 | 0 | 2 | 0 | 9 | 9 | (2) |
|  | 0.25 | 1 | 1 | 0 | 1 | 1 | 1 | 1 | 0 | 1 | 2 | 3 | 3 | 0 | 0 | 0 | 8 | 6 | (2) |
| 2-bromo-2'-tert-butyl-6'-methylacethanilide | 5 | 3 | 3 | 0 | 3 | 3 | 3 | 3 | 3 | 3 | 3 | 3 | 3 | 1 | 2 | 3 | 18 | 15 | (2) |
|  | 1 | 3 | 3 | 2 | 3 | 3 | 3 | 2 | 3 | 3 | 3 | 3 | 3 | 0 | 2 | 3 | 18 | 15 | (2) |
|  | 0.25 | 3 | 3 | 2 | 0 | 1 | 3 | 3 | 2 | 3 | 3 | 3 | 3 | 0 | 0 | 3 | 16 | 10 | (2) |
|  | 0.02 | 3 | 0 | 0 | 0 | 2 | 0 | 0 | 2 | 0 | 3 | 0 | 0 | 0 | 0 | 2 | 13 | 0 | (2) |
| 2'-tert-amyl-2-bromo-6'-methylacetanilide | 5 | 3 | 3 | 2 | 0 | 3 | 3 | 3 | 2 | 3 | 3 | 3 | 3 | 0 | 3 | 3 | 18 | 14 | (2) |
|  | 1 | 3 | 3 | 2 | 0 | 3 | 3 | 3 | 2 | 3 | 3 | 3 | 3 | 0 | 3 | 3 | 18 | 14 | (2) |
|  | 0.25 | 3 | 3 | 0 | 0 | 2 | 3 | 3 | 3 | 3 | 3 | 3 | 3 | 0 | 3 | 3 | 17 | 15 | (2) |
|  | 0.02 | 2 | 0 | 0 | 1 | 0 | 3 | 0 | 0 | 3 | 3 | 1 | 0 | 0 | 0 | 2 | 12 | 1 | (2) |
| 2-bromo-2'-(1,1-dimethylbutyl)-6'-methylacetanilide | 5 | 3 | 3 | 2 | 0 | 3 | 3 | 3 | 3 | 3 | 3 | 3 | 3 | 1 | 0 | 3 | 18 | 13 | (2) |
|  | 1 | 3 | 3 | 0 | 3 | 3 | 3 | 3 | 2 | 3 | 3 | 3 | 0 | 0 | 3 | 3 | 18 | 13 | (2) |
|  | 0.25 | 3 | 1 | 0 | 1 | 0 | 3 | 1 | 1 | 3 | 3 | 3 | 0 | 1 | 1 | 3 | 13 | 7 | (2) |
|  | 0.05 | 2 | 0 | 0 | 0 | 0 | 1 | 2 | 0 | 1 | 2 | 3 | 2 | 0 | 0 | 0 | 10 | 3 | (2) |
| 2-chloro-2'-methyl-6'-(1,1,3,3-tetramethylbutyl)-acetanilide | 25 | 3 | 0 | 0 | 3 | 0 | 3 | 0 | 0 | 3 | 3 | 0 | 0 | 0 | 0 | 3 | 15 | 3 | (1) |
|  | 5 | 3 | 0 | 1 | 2 | 0 | 3 | 0 | 1 | 3 | 3 | 0 | 1 | 0 | 0 | 0 | 14 | 5 | (1) |
|  | 1 | 3 | 0 | 0 | 0 | 0 | 3 | 0 | 0 | 3 | 3 | 0 | 0 | 0 | 0 | 0 | 9 | 4 | (2) |
| 2-bromo-2',6'-di-tert-butylacetanilide | 25 | 3 | 0 | 0 | 3 | 0 | 3 | 0 | 0 | 3 | 3 | 0 | 0 | 0 | 0 | 3 | 15 | 3 | (1) |
|  | 5 | 3 | 0 | 1 | 2 | 0 | 3 | 0 | 1 | 3 | 3 | 0 | 1 | 0 | 0 | 0 | 14 | 5 | (1) |
|  | 1 | 2 | 0 | 0 | 0 | 0 | 3 | 0 | 0 | 3 | 3 | 0 | 0 | 0 | 0 | 0 | 9 | 4 | (2) |
| 2'-tert-butyl-2-iodo-6'-methylacetanilide | 5 | 3 | 3 | 3 | 3 | 3 | 3 | 3 | 3 | 3 | 3 | 3 | 3 | 3 | 3 | 3 | 18 | 21 | (1) |
|  | 1 | 3 | 3 | 3 | 3 | 3 | 3 | 3 | 3 | 3 | 3 | 3 | 3 | 2 | 3 | 3 | 18 | 20 | (2) |
|  | 0.25 | 2 | 0 | 0 | 0 | 0 | 3 | 3 | 3 | 3 | 3 | 3 | 3 | 3 | 3 | 3 | 12 | 18 | (2) |

TABLE III.—PRE-EMERGENCE PHYTOTOXIC ACTIVITY—Continued

| Compound | Rate, lb./acre | A | B | C | D | E | F | G | H | I | J | K | L | M | N | O | Grass | Broadleaf | Comments |
|---|---|---|---|---|---|---|---|---|---|---|---|---|---|---|---|---|---|---|---|
| 2'-tert-butyl-6'-ethyl-2-iodoacetanilide. | 5 | 3 | 2 | 2 | 3 | 3 | 3 | 1 | 1 | 3 | 3 | 3 | 2 | 1 | 3 | 3 | 18 | 13 | (2) |
|  | 1 | 3 | 1 | 0 | 3 | 3 | 3 | 0 | 1 | 3 | 3 | 3 | 1 | 0 | 3 | 3 | 18 | 8 | (2) |
|  | 0.25 | 3 | 0 | 0 | 3 | 1 | 2 | 0 | 0 | 3 | 3 | 3 | 0 | 0 | 0 | 2 | 14 | 3 | (2) |
|  | 0.05 | 3 | 0 | 0 | 2 | 2 | 0 | 0 | 0 | 3 | 3 | 3 | 0 | 0 | 0 | 3 | 13 | 3 | (2) |
| 2-bromo-2'-tert-butyl-6'-isopropylacetanilide. | 5 | 3 | 0 | 0 | 3 | 2 | 3 | 0 | 0 | 3 | 3 | 3 | 0 | 0 | 2 | 3 | 17 | 5 | (1) |
|  | 1 | 3 | 0 | 0 | 3 | 3 | 3 | 0 | 0 | 3 | 3 | 3 | 0 | 0 | 0 | 3 | 18 | 3 | (2) |
|  | 0.25 | 3 | 0 | 0 | 0 | 1 | 3 | 0 | 0 | 3 | 3 | 3 | 0 | 0 | 0 | 3 | 13 | 0 | (2) |
|  | 0.07 | 2 | 1 | 0 | 0 | 0 | 3 | 0 | 0 | 3 | 3 | 3 | 0 | 1 | 2 | 1 | 10 | 6 | (2) |
| 2-chloro-2'-(1,1-dimethylbutyl)-6'-methylacetanilide. | 5 | 3 | 3 | 1 | 3 | 3 | 3 | 2 | 3 | 3 | 3 | 3 | 1 | 3 | 3 | 3 | 18 | 16 | (2) |
|  | 1 | 3 | 3 | 2 | 1 | 3 | 3 | 3 | 3 | 3 | 3 | 3 | 1 | 1 | 2 | 3 | 18 | 14 | (2) |
|  | 0.25 | 3 | 1 | 0 | 1 | 3 | 3 | 0 | 3 | 3 | 3 | 3 | 0 | 0 | 0 | 3 | 16 | 6 | (2) |
| 2-bromo-2'-tert-butyl-6'-ethylacetanilide. | 5 | 3 | 1 | 2 | 3 | 3 | 3 | 1 | 0 | 3 | 3 | 3 | 0 | 1 | 2 | 3 | 18 | 9 | (1) |
|  | 1 | 3 | 2 | 1 | 3 | 3 | 3 | 2 | 2 | 3 | 3 | 3 | 0 | 2 | 3 | 3 | 18 | 13 | (2) |
|  | 0.25 | 3 | 0 | 0 | 3 | 3 | 3 | 0 | 0 | 3 | 3 | 3 | 1 | 0 | 0 | 3 | 18 | 4 | (2) |
|  | 0.05 | 3 | 0 | 0 | 3 | 3 | 3 | 0 | 0 | 3 | 2 | 2 | 0 | 0 | 0 | 3 | 17 | 2 | (2) |
| 2'-tert-butyl-2-chloro-6'-methoxyacetanilide. | 5 | 3 | 2 | 0 | 3 | 0 | 3 | 1 | 1 | 3 | 3 | 3 | 0 | 2 | 3 | 3 | 15 | 10 | (1) |
|  | 1 | 3 | 2 | 0 | 0 | 0 | 3 | 0 | 0 | 3 | 3 | 3 | 0 | 0 | 0 | 3 | 12 | 0 | (1) |
| 2'-tert-butyl-2-iodo-6'-methoxyacetanilide. | 5 | 3 | 1 | 0 | 3 | 3 | 3 | 0 | 0 | 3 | 3 | 3 | 0 | 0 | 3 | 3 | 18 | 6 | (1) |
|  | 1 | 3 | 1 | 0 | 3 | 2 | 3 | 2 | 1 | 3 | 3 | 3 | 1 | 0 | 1 | 3 | 17 | 8 | (1) |
|  | 0.25 | 3 | 0 | 0 | 3 | 1 | 3 | 0 | 0 | 3 | 3 | 3 | 1 | 0 | 0 | 3 | 16 | 4 | (1) |
| 2-bromo-2'-tert-butyl-6'-methoxyacetanilide. | 5 | 3 | 2 | 1 | 3 | 3 | 3 | 2 | 1 | 3 | 3 | 3 | 1 | 0 | 3 | 2 | 18 | 11 | (1) |
|  | 1 | 3 | 1 | 0 | 3 | 3 | 3 | 1 | 2 | 3 | 3 | 3 | 0 | 0 | 3 | 3 | 18 | 9 | (1) |
|  | 0.25 | 3 | 1 | 0 | 3 | 3 | 3 | 2 | 1 | 3 | 3 | 3 | 0 | 0 | 2 | 3 | 18 | 8 | (1) |
|  | 0.05 | 2 | 0 | 0 | 2 | 0 | 2 | 0 | 0 | 3 | 3 | 3 | 0 | 0 | 0 | 1 | 11 | 0 | (2) |
| 2'-tert-butyl-2-chloro-6'-methyl-5'-nitroacetanilide. | 5 | 3 | 2 | 3 | 3 | 3 | 3 | 0 | 0 | 3 | 3 | 3 | 1 | 0 | 3 | 3 | 18 | 10 | (1) |
|  | 1 | 3 | 0 | 0 | 3 | 3 | 3 | 0 | 0 | 3 | 3 | 3 | 1 | 0 | 0 | 3 | 18 | 4 | (2) |
| 2-bromo-2'-tert-butyl-5'-chloro-6'-methylacetanilide. | 1 | 3 | 0 | 0 | 3 | 3 | 3 | 1 | 0 | 3 | 3 | 2 | 0 | 1 | 1 | 2 | 17 | 5 | (2) |
|  | 0.5 | 3 | 1 | 0 | 1 | 2 | 2 | 1 | 1 | 3 | 3 | 3 | 1 | 1 | 1 | 3 | 14 | 8 | (2) |
| 2'-tert-butyl-2,5'-dichloro-6'-methylacetanilide. | 1 | 3 | 1 | 1 | 2 | 1 | 3 | 0 | 1 | 3 | 3 | 2 | 0 | 0 | 2 | 2 | 14 | 6 | (2) |
|  | 0.5 | 2 | 1 | 1 | 2 | 0 | 1 | 0 | 1 | 3 | 3 | 1 | 1 | 0 | 2 | 1 | 10 | 6 | (2) |
|  | 0.25 | 3 | 0 | 0 | 3 | 3 | 3 | 0 | 0 | 3 | 3 | 1 | 0 | 0 | 0 | 3 | 18 | 1 | (2) |
| 2'-tert-butyl-2-chloro-5',6'-dimethylacetanilide. | 5 | 3 | 3 | 2 | 3 | 2 | 3 | 2 | 2 | 3 | 3 | 3 | 2 | 1 | 3 | 3 | 17 | 15 | (1) |
|  | 1 | 3 | 2 | 3 | 3 | 3 | 3 | 1 | 1 | 3 | 3 | 3 | 2 | 0 | 3 | 3 | 18 | 13 | (1) |
|  | 0.25 | 2 | 0 | 1 | 2 | 0 | 2 | 0 | 1 | 3 | 3 | 3 | 2 | 1 | 0 | 1 | 11 | 5 | (2) |
| 2-chloro-5',6'-dimethyl-2'-(1,1-dimethylpropyl)acetanilide. | 5 | 3 | 2 | 3 | 3 | 2 | 3 | 2 | 2 | 3 | 3 | 3 | 1 | 1 | 3 | 3 | 17 | 15 | (1) |
|  | 1 | 3 | 2 | 3 | 2 | 2 | 3 | 1 | 1 | 3 | 3 | 3 | 1 | 1 | 3 | 3 | 16 | 13 | (1) |
|  | 0.25 | 2 | 0 | 1 | 0 | 0 | 3 | 0 | 0 | 3 | 3 | 3 | 1 | 0 | 0 | 1 | 12 | 3 | (1) |
| 2-bromo-2'-tert-butyl-5',6'-dimethylacetanilide. | 5 | 3 | 1 | 0 | 3 | 2 | 3 | 2 | 0 | 3 | 3 | 3 | 0 | 0 | 2 | 3 | 17 | 7 | (1) |
|  | 1 | 3 | 0 | 0 | 3 | 3 | 3 | 0 | 1 | 3 | 3 | 3 | 0 | 0 | 1 | 3 | 18 | 5 | (2) |
|  | 0.25 | 3 | 0 | 0 | 3 | 3 | 3 | 0 | 0 | 3 | 3 | 3 | 0 | 0 | 0 | 3 | 18 | 3 | (2) |
|  | 0.05 | 3 | 0 | 0 | 0 | 3 | 2 | 0 | 1 | 3 | 3 | 2 | 0 | 0 | 0 | 3 | 14 | 3 | (2) |
| 2'-tert-butyl-2-iodo-5',6'-dimethylacetanilide. | 5 | 3 | 0 | 0 | 3 | 3 | 2 | 0 | 0 | 3 | 3 | 2 | 0 | 0 | 0 | 3 | 17 | 2 | (1) |
|  | 1 | 3 | 0 | 0 | 3 | 3 | 3 | 0 | 0 | 3 | 3 | 3 | 0 | 0 | 0 | 3 | 18 | 3 | (2) |
|  | 0.25 | 3 | 0 | 0 | 1 | 3 | 2 | 0 | 0 | 3 | 3 | 2 | 0 | 0 | 0 | 3 | 15 | 2 | (2) |
|  | 0.05 | 2 | 0 | 0 | 0 | 3 | 0 | 0 | 0 | 3 | 3 | 1 | 0 | 0 | 0 | 2 | 11 | 1 | (2) |
| 2-chloro-5',6'-dimethyl-2'-(1,1-dimethylbutyl)acetanilide. | 5 | 3 | 2 | 1 | 3 | 3 | 3 | 2 | 3 | 3 | 3 | 3 | 1 | 3 | 3 | 3 | 18 | 16 | (1) |
|  | 1 | 3 | 1 | 1 | 3 | 3 | 3 | 0 | 0 | 3 | 3 | 3 | 0 | 0 | 1 | 3 | 18 | 5 | (1) |
|  | 0.25 | 3 | 3 | 0 | 0 | 3 | 3 | 0 | 0 | 3 | 3 | 3 | 1 | 0 | 0 | 3 | 18 | 1 | (1) |
| 2-bromo-5',6'-dimethyl-2'-(1,1-dimethylbutyl)acetanilide. | 5 | 3 | 1 | 0 | 3 | 3 | 3 | 2 | 1 | 3 | 3 | 3 | 1 | 3 | 0 | 3 | 18 | 10 | (1) |
|  | 1 | 3 | 1 | 0 | 3 | 3 | 3 | 1 | 0 | 3 | 3 | 2 | 0 | 1 | 0 | 3 | 18 | 4 | (1) |
|  | 0.25 | 3 | 1 | 0 | 3 | 3 | 3 | 2 | 0 | 3 | 3 | 3 | 0 | 1 | 0 | 3 | 18 | 6 | (1) |
| 2'-tert-butyl-2,6'-dichloroacetanilide. | 25 | 3 | 2 | 2 | 3 | 2 | 3 | 1 | 2 | 3 | 3 | 3 | 3 | 1 | 3 | 3 | 17 | 15 | (1) |
|  | 5 | 2 | 1 | 1 | 3 | 0 | 3 | 0 | 0 | 3 | 3 | 3 | 0 | 1 | 1 | 0 | 12 | 6 | (1) |
|  | 1 | 2 | 0 | 0 | 1 | 0 | 2 | 0 | 0 | 3 | 3 | 3 | 0 | 0 | 1 | 0 | 9 | 4 | (1) |
| 2'-tert-butyl-2-chloro-5'-methylacetanilide. | 5 | 3 | 1 | 0 | 3 | 2 | 3 | 0 | 2 | 3 | 3 | 3 | 0 | 0 | 1 | 3 | 17 | 6 | (1) |
|  | 1 | 3 | 0 | 0 | 3 | 1 | 3 | 0 | 0 | 3 | 3 | 0 | 0 | 0 | 0 | 3 | 16 | 0 | (2) |
|  | 0.25 | 2 | 0 | 0 | 3 | 1 | 2 | 0 | 0 | 3 | 3 | 0 | 0 | 0 | 0 | 0 | 12 | 0 | (2) |
| 2-bromo-2'-tert-butyl-5'-methylacetanilide. | 5 | 2 | 1 | 0 | 2 | 0 | 2 | 0 | 1 | 3 | 3 | 3 | 1 | 0 | 0 | 1 | 11 | 5 | (1) |

(1) Surface application.  (2) Incorporated in soil.

The data in Table III illustrate the general phytotoxic activity as well as the selective phytotoxic activity of the α-haloacetanilides of this invention. It will be noted that the α-haloacetanilides demonstrate very outstanding general phytotoxic activity at several rates of application, including rates as low as one pound per acre and lower. Thus, these α-haloacetanilides are particularly useful in soil sterilization applications. It will also be noted from the data in Table III that unusual grass specificity can be obtained at lower levels of application. Such grass specificity is achieved at extremely low application rates, for example, at rates at low as 0.05 lb. per acre with 2'-tert-butyl-2-chloro-6'-methylacetanilide and 2-bromo-2'-tert-butyl-5',6'-dimethylacetanilide so that very economical treatment is possible. The three botanical types or genera of grasses effectively controlled by the α-haloacetanilides of this invention embrace a large number of plants frequency found in vegetable crops. But these α-haloacetanilides are not limited to removing grasses from broadleaf plants, since the selective action is such that certain genera of grasses can be removed from corn, which is also a genus of grass.

The data in Table IV illustrate the outstanding general and selective herbicidal activity of some of the ortho-substituted nitrogen-substituted α-haloacetanilides of Formula III. It will be noted that the nitrogen-substituted α-haloacetanilides which are nuclear-substituted with a tertiary alkyl group in one ortho position and another substitutent in the other ortho position posses unusual grass specificity and, furthermore, that these α-haloacetanilides have unusually high activity at extremely low application rates. Although these α-haloacetanilides demonstrate some inherent selectivity at the higher application rates, the selectively is increased at lower application rates. For example, 2'-tert-butyl-2-chloro-N,6'-dimethylacetanilide has a general grass rating of 3 and a general broadleaf rating of 2 at an application rate of 5 lb./acre but at an application rate of 0.7 lb./acre the corresponding ratings are 3 and 1, and at an application rate of 0.3 lb./acre the corresponding ratings become 3 and 0. Thus, not only is good grass specificity obtainable but the rate of application is so low that very economical treatment is possible.

TABLE IV.—PRE-EMERGENCE HERBICIDAL ACTIVITY OF THE N-SUBSTITUTED ORTHO-SUBSTITUTED ALPHA-HALOACETANILIDES

| Compound | Rate, lb./Acre | Plant type | | | | | | | | | | | | | | | Total injury rating | | Comments |
|---|---|---|---|---|---|---|---|---|---|---|---|---|---|---|---|---|---|---|---|
| | | A | B | C | D | E | F | G | H | I | J | K | L | M | N | O | Grass | Broadleaf | |
| 2'tert-butyl-2-chloro-N,6'-dimethylacetanilide. | 5 | 3 | 2 | 2 | 3 | 3 | 3 | 1 | 3 | 3 | 3 | 3 | 1 | 1 | 3 | 3 | 18 | 14 | (1) |
| | 0.7 | 3 | 1 | 0 | 3 | 3 | 3 | 1 | 2 | 3 | 3 | 3 | 0 | 0 | 0 | 3 | 18 | 6 | (2) |
| | 0.3 | 3 | 0 | 0 | 0 | 2 | 3 | 0 | 1 | 3 | 3 | 2 | 0 | 0 | 0 | 2 | 13 | 3 | (2) |
| | 0.15 | 2 | 0 | 0 | 0 | 1 | 3 | 0 | 2 | 3 | 3 | 1 | 2 | 0 | 0 | 2 | 12 | 5 | (2) |
| 2'tert-butyl-2-chloro-N-ethyl-6'-methylacetanilide. | 5 | 3 | 2 | 0 | 3 | 3 | 3 | 0 | 3 | 3 | 3 | 3 | 0 | 1 | 3 | 3 | 18 | 10 | (1) |
| | 0.7 | 3 | 0 | 0 | 1 | 2 | 3 | 0 | 1 | 3 | 3 | 2 | 0 | 1 | 0 | 2 | 14 | 4 | (2) |
| | 0.3 | 2 | 0 | 0 | 0 | 2 | 3 | 0 | 1 | 3 | 3 | 0 | 0 | 0 | 0 | 0 | 11 | 1 | (2) |
| 2'-tert-butyl-2-chloro-N-iso-butyl-6'-methylacetanilide. | 5 | 2 | 1 | 1 | 0 | 0 | 3 | 0 | 1 | 3 | 3 | 3 | 1 | 0 | 1 | 2 | 11 | 7 | (1) |
| N-allyl-2'-tert-butyl-2-chloro-6-methylacetanilide. | 5 | 2 | 2 | 3 | 0 | 0 | 3 | 0 | 1 | 3 | 3 | 3 | 0 | 0 | 3 | 3 | 12 | 10 | (1) |
| | 1 | 3 | 0 | 0 | 3 | 3 | 3 | 0 | 0 | 3 | 3 | 3 | 0 | 0 | 0 | 3 | 18 | 3 | (2) |
| | 0.15 | 3 | 0 | 0 | 0 | 2 | 3 | 0 | 0 | 3 | 3 | 0 | 0 | 0 | 0 | 2 | 13 | 0 | (2) |
| 2'-tert-butyl-2-chloro-N-ethoxyeth 1-6'-ethylacetanilide. | 5 | 3 | 3 | 3 | 3 | 3 | 3 | 3 | 3 | 3 | 3 | 3 | 3 | 3 | 3 | 3 | 18 | 21 | (1) |
| | 1 | 3 | 0 | 0 | 3 | 3 | 3 | 0 | 0 | 3 | 3 | 1 | 2 | 0 | 1 | 3 | 18 | 4 | (2) |
| | 0.25 | 3 | 0 | 0 | 2 | 3 | 3 | 0 | 1 | 3 | 3 | 0 | 1 | 0 | 0 | 3 | 17 | 2 | (2) |
| | 0.05 | 2 | 0 | 0 | 0 | 0 | 3 | 0 | 0 | 3 | 3 | 0 | 0 | 0 | 0 | 2 | 11 | 0 | (2) |

(1) Surface application. (2) Incorporated in soil.

The pre-emergence herbicidal activity of some of the N-substituted ortho-substituted α-haloacetanilides of Formula IV are set forth in Table V for various application rates of these α-haloacetanilides in both surface and soil-incorporated applications.

TABLE V.—PRE-EMERGENCE HERBICIDAL ACTIVITY OF THE N-SUBSTITUTED ORTHO SUBSTITUTED ALPHA-HALOACETANILIDES

| Compound | Rate, lb./Acre | Plant type | | | | | | | | | | | | | | | Total injury rating | | Comments |
|---|---|---|---|---|---|---|---|---|---|---|---|---|---|---|---|---|---|---|---|
| | | A | B | C | D | E | F | G | H | I | J | K | L | M | N | O | Grass | Broadleaf | |
| N-allyl-2'-tert-butyl-2-chloroacetanilide. | 25 | 3 | 3 | 2 | 3 | 3 | 3 | 0 | 3 | 3 | 3 | 2 | 3 | 3 | 3 | | 18 | 16 | (1) |
| | 5 | 3 | 0 | 0 | 3 | 3 | 3 | 0 | 0 | 3 | 3 | 3 | 1 | 0 | 1 | 3 | 18 | 5 | (2) |
| | 1 | 3 | 0 | 1 | 1 | 3 | 3 | 0 | 0 | 3 | 3 | 3 | 1 | 0 | 0 | 3 | 16 | 5 | (2) |
| 2'-tert-butyl-2-chloro-N-propylacetanilide. | 25 | 3 | 2 | 0 | 3 | 3 | 3 | 1 | 3 | 3 | 3 | 3 | 1 | 0 | 2 | 3 | 18 | 10 | (1) |
| | 5 | 3 | 0 | 0 | 1 | 3 | 3 | 0 | 1 | 3 | 3 | 3 | 1 | ---- | 0 | 3 | 16 | *5 | (2) |
| | 1 | 2 | 0 | 0 | 0 | 0 | 3 | 0 | 1 | 3 | 2 | 2 | 1 | ---- | 0 | 2 | 10 | *4 | (2) |
| 2'-tert-butyl-2-chloro-N-methylacetanilide. | 25 | 3 | 3 | 3 | 3 | 3 | 3 | 2 | 3 | 3 | 3 | 3 | 0 | ---- | 3 | 3 | 18 | *14 | (1) |
| | 5 | 3 | 3 | 3 | 3 | 3 | 3 | 2 | 3 | 3 | 3 | 3 | 3 | ---- | 3 | 3 | 18 | *17 | (1) |
| | 1 | 3 | 3 | 3 | 3 | 3 | 3 | 1 | 3 | 3 | 3 | 3 | 0 | 3 | 3 | 3 | 18 | 16 | (2) |
| | 0.25 | 3 | 0 | 2 | 2 | 3 | 3 | 0 | 1 | 3 | 3 | 3 | 0 | 0 | 0 | 3 | 17 | 3 | (2) |
| | 0.05 | 2 | 0 | 0 | 0 | 0 | 2 | 0 | 1 | 3 | 3 | 2 | 0 | 1 | 0 | 1 | 9 | 4 | (2) |
| 2'-tert-butyl-2-chloro-N-ethylacetanilide. | 25 | 3 | 3 | 3 | 3 | 3 | 3 | 2 | 3 | 3 | 3 | 3 | 0 | ---- | 3 | 3 | 18 | *14 | (1) |
| | 5 | 3 | 3 | 3 | 3 | 3 | 3 | 1 | 3 | 3 | 3 | 3 | 1 | ---- | 2 | 3 | 18 | *13 | (1) |
| | 1 | 3 | 0 | 0 | 3 | 3 | 3 | 0 | 0 | 3 | 3 | 3 | 0 | 0 | 0 | 3 | 18 | 3 | (2) |
| | 0.25 | 2 | 0 | 0 | 0 | 1 | 3 | 0 | 0 | 3 | 2 | 2 | 0 | 0 | 0 | 1 | 10 | 2 | (2) |
| 2'tert-butyl-N-isobutyl-2-chloroacetanilide. | 5 | 2 | 2 | 2 | 0 | 0 | 3 | 0 | 3 | 3 | 3 | 3 | ---- | 0 | 0 | 2 | 11 | *8 | (1) |
| 2'-tert-butyl-2-chloro-N-(2-propynyl)acetanilide. | 5 | 3 | 3 | 3 | 3 | 3 | 3 | 0 | 3 | 3 | 3 | 3 | 3 | 0 | 3 | 3 | 18 | 15 | (1) |
| | 1 | 2 | 0 | 0 | 1 | 0 | 3 | 0 | 0 | 3 | 3 | 2 | 0 | 0 | 0 | 2 | 12 | 2 | (2) |
| | 0.25 | 2 | 0 | 0 | 1 | 1 | 2 | 0 | 0 | 2 | 3 | 0 | 0 | 0 | 0 | 1 | 10 | 0 | (2) |

* One species missing. (1) Surface application. (2) Incorporated in soil.

The α-haloacetanilides of Formulae II, III and IV posses valuable contact or post-emergence activity in addition to their pre-emergence activity as demonstrated hereinbefore. Thus, all of the compounds of the present invention have significant phytotoxic properties when applied before or after emergence.

The phytotoxic compositions of this invention are either particulate solid or liquid concentrate compositions comprising the active ingredient and either a particulate solid or liquid adjuvant which is a formulation aid or conditioning agent permitting the composition to be readily mixed with a suitable solid or liquid carrier for application in a form which enables prompt assimilation by the plant systems. Thus, the compositions of this invention include not only the concentrate compositions comprising the active ingredient and the adjuvant, but also toxicant compositions applied in the field comprising the concentrate composition( i.e., active ingredient plus adjuvant) and the carrier.

As demonstrated above, quite different effects can be obtained by modifying the method of use of the compositions of this invention. Thus, unusual grass specificity can be achieved at lower levels of application whereas at higher levels of application a more general phytotoxic effect or soil sterilization takes place. Therefore, an essential part of this invention is the formulation of compositions so as to permit a uniform predetermined application of the composition to the plant environment to produce the desired effect.

Phytotoxic adjuvants useful in preparing the concentrate compositions include particulate solid or liquid extending agents such as solvents or diluents within which the active ingredient is dissolved, suspended, or distributed; wetting or emulsifying agents which serve in providing uniform dispersions or solutions of the active ingredient in the extending agents; and adhesive agents or spreading agents which improve the contact of the active ingredient with the soil or plant surfaces. All compositions of this invention include at least one of the above types of adjuvants and usually include an extending agent and a wetting or emulsifying agent because of the nature of the physical properties of the α-haloacetamides.

In general, the α-haloacetamides are insoluble in water and in many organic solvents. The active ingredients need not be dissolved in the extending agent but may merely by dispersed or suspended. Examples of suitable organic solvents for use as extending agents include hexane, benzene, toluene, acetone, cyclohexanone, methylethylketone, isopropanol, butanediol, methanol, diacetone alcohol, xylene, dioxane, isopropyl ether, ethylene dichloride, tetrachloroethane, hydrogenated naphthalene, solvent naphtha, petroleum fractions (e.g., kerosene, etc.), and the like. True solutions can be made by using mixtures of organic solvents, for example, 1:1 and 1:2 mixtures of xylene and cyclohexanone.

Solid, particulate extending agents are also very useful in the practice of the present invention. The active ingredient is either adsorbed or dispersed on or in the finely-divided solid material. Suitable solid extending agents include the natural clays, such as china clays, bentonites, and attapulgites; other minerals in natural state, such as talc, pyrophyllite, quartz, diatomaceous earth, fuller's earth, chalk, rock phosphate, kaolin, kieselguhr volcanic ash, salt, and sulfur; the chemically modified minerals, such as acid-washed bentonite, precipitated calcium phosphate, precipitated calcium carbonate, calcined magnesia, and colloidal silica; and other solid materials such as powdered cork, powdered wood and powdered pecan or walnut shells. These materials are used in finely-divided form, at least in a size range of 20–40 mesh (Tyler) and preferably in much finer size.

The particulate solid concentrate compositions are applied to the soil in admixture with a particulate solid carrier material, or as a wettable powder using a liquid carrier material. When the latter method is used, a wetting agent or surface active agent is added to the concentrate composition to render the particulate solid extending agent wettable by water, providing a stable aqueous dispersion or suspension suitable for use as a spray.

The surface active agent used in the compositions of this invention to serve in providing uniform dispersions of all formulation components of both liquid and dust types in both the concentrate compositions and the toxicant compositions applied, can be anionic, cationic, or nonionic types, including mixtures thereof. Suitable surface active agents for the preparation of both solid and liquid compositions include the conventional soaps, such as salts of long-chain carboxylic acids; sulfonated animal, vegetable, and mineral oils; quaternary salts of high molecular weight acids; rosin soaps, such as salts of abietic acid; sulfuric acid salts of high molecular weight organic compounds; algin soaps, ethylene oxide condensated with fatty acids, alkyl phenols and mercaptans; and other simple and polymeric compositions having both hydrophilic and hydrophobic functions.

The liquid concentrate compositions of this invention preferably comprise from about 5% to about 95% by weight of the active ingredient and the remainder the adjuvant, which may be solely liquid extending agent or surface active agent (including adhesive agent), but preferably is a combination of liquid extending agent and surface active agent. It is preferred, however, that the herbicidal adjuvant be the major component in the composition. Preferably the surface active agent comprises from approximately 0.1% to about 15% by weight of the total concentrate composition, the remainder of the composition being liquid extending agent.

Since the α-haloacetamides are very toxic and are usually applied at low rates to obtain selectivity, the concentration of the active ingredient in the dust compositions may be as low as 1% or less by weight. When the dust compositions are to be used for soil sterilization, it is desirable to have a high concentration and the active ingredient may constitute as much as 5% to 98% by weight of the total composition. The remainder of the compositions consists of the adjuvants.

The carrier material, used for the uniform distribution of the α-haloacetamides in effective amounts, can be either a liquid or a particulate solid material. Normally, the carrier material is the major component in the compositions as applied, and constitutes more than 50% by weight of the composition. For reasons of economy, water is the preferred liquid carrier, both for the liquid concentrate composition and the wettable powder concentrate. Suitable solid carriers include the particulate extending agents noted above, also solid fertilizers such as ammonium nitrate, urea, and superphosphate, as well as other materials in which plant organisms take root and grow, such as compost, manure, humus, sand and the like.

The compositions of this invention can also contain other additaments such as fertilizers and pesticides, used as, or in combination with, the carrier materials. For example, phytotoxicants useful in combination with the above-described compounds include 2,4-dichlorophenoxyacetic acids, 2,4,5-trichlorophenoxyacetic acid, 2-methyl-4-chlorophenoxyacetic acid and the salts, esters and amides thereof; triazine derivatives, such as 2,4-bis(3-methoxypropylamino)-6-methylthio-S-triazine; 2 - chloro-4-ethylamino-6-isopropylamino - S - triazine, and 2-ethyl-amino-4-isopropylamino-6-methylmercapto - S - triazine; urea derivatives, such as 3-(3,4-dichlorophenyl)-1,1-dimethyl urea and 3-(p-chlorophenyl)-1,1-dimethyl urea; acetanilides such as N-isopropyl-α-chloroacetanilide, and N-ethyl-α-chloro-2-methyl acetanilide and 2-tert-butyl-2'-chloro-6-methylacetanilide, and acetamides such as N,N-diallyl-α-chloroacetamide, N-(α-chloroacetyl)hexamethylene imine, and N,N-diethyl-α-bromoacetamide, and the like.

The present compositions can be applied to the foliage of growing plants by the use of power-dusters, boom and hand sprayers, spray-dusters, by addition to irrigation water, and by other conventional means. The compositions can also be applied from airplanes as a dust or a spray because they are effective in very low dosages.

The dosage to be applied to the plant system is dependent not only upon the specific α-haloacetamide, but also upon the particular plant species to be modified and the stage of growth thereof, as well as the part of the plant to be contacted with the toxicant. In non-selective foliage treatments the compositions of this invention are usually applied at an approximate rate of from 5 to 50 lbs. of α-haloacetanilide per acre but lower or higher rates are appropriate in some cases. In non-selective pre-emergence treatments, these compositions are usually applied at a somewhat lower rate, but one within the same general range; that is, from 1 to 25 lbs. per acre. However, because of the unusually high unit activity possessed by the present compositions, soil sterilization is ordinarily accomplished at a rate in the range of 1 to 10 lbs. per acre. In selective pre-emergence applications to the soil, a dosage of from 0.05 to 5 lbs. of active ingredient per acre is usually employed but lower or higher rates may be necessary in some instances. It is believed that one skilled in the art can readily determine from this disclosure, including the examples, the optimum rate to be applied in any particular case.

Although the invention is described with respect to specific modifications, the details thereof are not to be construed as limitations except to the extent indicated in the following claims.

The embodiments of the invention in which an exclusive property or privilege is claimed are defined as follows.

1. Alpha-haloacetanilide of

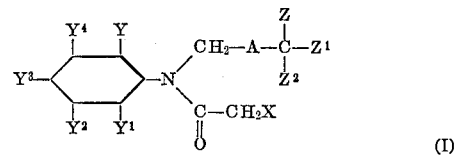

(I)

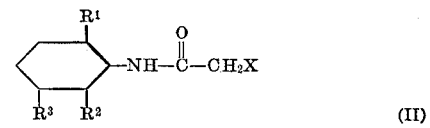

(II)

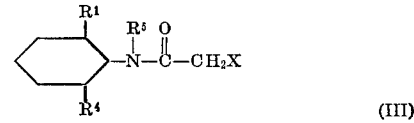

(III)

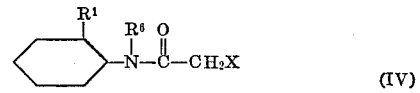

(IV)

wherein Y and $Y^1$ are hydrogen, alkyl or alkoxy each of a maximum of 10 carbon atoms, and $Y^2$, $Y^3$ and $Y^4$ are hydrogen, halogen or alkyl each of a maximum of 10 carbon atoms, A is oxygen, X is chlorine, bromine, or iodine, and Z, $Z^1$ and $Z^2$ are hydrogen, alkyl, hydroxyalkyl, haloalkyl, alkenyl, alkynyl, alkoxy or polyalkoxy each of from 1 to 18 carbon atoms, or heterocyclyl selected from the group consisting of furfuryl, thiofuranyl, pyrrolyl, thiazolyl, pyranyl, oxazinyl and triazinyl, $R^1$ is tertiary alkyl of not less than 4 and a maximum of 10 carbon atoms, $R^2$ is hydrogen, halogen, alkyl of not more than 8 carbon atoms or alkoxy of not more than 4 carbon atoms, R³ is hydrogen, primary or secondary alkyl each of not more than 6 carbon atoms, chloride or nitro, provided that one and not more than one of R² and R³ is always hydrogen unless R² is primary or secondary alkyl in which case R³ is as defined above and further provided that R² is primary or secondary alkyl when R³ is chloride or nitro, R⁴ is alkyl of not more than 8 carbon atoms, R⁵ is primary or secondary alkyl, alkenyl, alkoxyalkyl or alkynyl, each of not more than 6 carbon atoms, R⁶ is primary alkyl, alkenyl or alkynyl, each of not more than 4 carbon atoms, and X is chlorine, bromine or iodine.

2. A compound of the formula

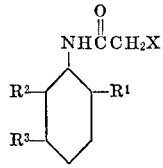

wherein R¹ is tertiary alkyl of not less than 4 and not more than 10 carbon atoms, R² is selected from the group consisting of hydrogen, halogen, primary alkyl of a maximum of 8 carbon atoms, secondary alkyl of not more than 8 carbon atoms, tertiary alkyl of not more than 8 carbon atoms and alkoxy of not more than 4 carbon atoms, R³ is selected from the group consisting of hydrogen, primary alkyl of not more than 6 carbon atoms, secondary alkyl of not more than 6 carbon atoms, chloride, and nitro, and X is selected from the group consisting of chloride, bromide and iodide, provided that one and not more than one of R² and R³ is always hydrogen unless R² is primary alkyl or secondary alkyl in which case R³ is as defined above and further provided that R² is primary alkyl or secondary alkyl when R³ is chloride or nitro.

3. Compound of claim 2 wherein R² is primary alkyl of not more than 8 carbon atoms and R³ is primary alkyl of not more than 6 carbon atoms.

4. Compound of claim 2 wherein R² is primary alkyl of not more than 8 carbon atoms and R³ is chlorine.

5. Compound of claim 2 wherein R² is primary alkyl of not more than 8 carbon atoms and R³ is nitro.

6. Compound of claim 2 which is 2′-tert-butyl-2-chloro-6′-methyl-5′-nitroacetanilide.

7. Compound of claim 2 which is 2-bromo-2′-tert-butyl-5′-chloro-6′-methylacetanilide.

8. Compound of claim 2 which is 2′-tert-butyl-2,5′-dichloro-6′-methylacetanilide.

9. Compound of claim 2 which is 2′-tert-butyl-2-chloro-5′,6′-dimethylacetanilide.

10. Compound of claim 2 which is 2-chloro-5′,6′-dimethyl-2′-(1,1-dimethylpropyl)acetanilide.

11. Compound of claim 2 which is 2-bromo-2′-tert-butyl-5′,6′-dimethylacetanilide.

12. Compound of claim 2 which is 2′-tert-butyl-2-iodo-5′,6′-dimethylacetanilide.

13. Compound of claim 2 which is 2-chloro-5′,6′-dimethyl-2′-(1,1-dimethylbutyl)acetanilide.

14. Compound of claim 2 which is 2-bromo-5′,6′-dimethyl-2′-(1,1-dimethylbutyl)acetanilide.

15. Compound of claim 2 wherein R² is alkoxy of not more than 4 carbon atoms, R¹ is tertiary alkyl of not less than 4 and not more than 5 carbon atoms, and X is chlorine.

16. Compound of claim 2 wherein R² is alkoxy of not more than 4 carbon atoms, R¹ is tertiary alkyl of not less than 4 and not more than 5 carbon atoms, and X is bromine.

17. Compound of claim 2 which is 2-bromo-2′-tert-butyl-6′-methoxyacetanilide.

18. Compound of claim 2 which is 2′-tert-butyl-2-chloro-6′-methylacetanilide.

19. Compound of claim 2 which is 2-bromo-2′-tert-butyl-6′-methylacetanilide.

20. Compound of claim 2 which is 2′-tert-amyl-2-bromo-6′-methylacetanilide.

21. Compound of claim 2 which is 2-tert-butyl-2-iodo-6′-methylacetanilide.

22. Compound of claim 2 wherein X is chlorine, R¹ is tertiary alkyl of not less than 4 and not more than 5 carbon atoms, and R² is alkyl of a maximum of 3 carbon atoms.

23. Compound of claim 2 wherein X is bromine, R¹ is tertiary alkyl of not less than 4 and not more than 5 carbon atoms, and R² is alkyl of not more than 4 carbon atoms.

24. Compound of claim 2 wherein X is iodine, R¹ is tertiary alkyl of not less than 4 and not more than 5 carbon atoms, and R² is alkyl of not more than 4 carbon atoms.

25. Compound of claim 2 which is 2′-tert-butyl-2,6′-dichloroacetanilide.

26. Compound of claim 2 wherein R² and X are chlorine, and R³ is hydrogen.

27. Compound of claim 2 wherein R² is chlorine, X is bromine, and R³ is hydrogen.

28. Compound of claim 2 wherein said R² is hydrogen, X is chlorine, and R³ is primary alkyl of not more than 6 carbon atoms.

29. Compound of claim 2 which is 2′-tert-butyl-2-chloro-5′-methylacetanilide.

30. Compound of claim 2 which is 2-bromo-2′-tert-butyl-5′-methylacetanilide.

31. Compound of claim 2 wherein R² is hydrogen, X is bromine, and R³ is primary alkyl of not more than 6 carbon atoms.

32. An alpha-haloacetanilide of the formula

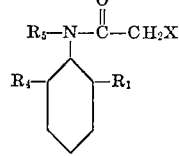

wherein R₁ is tertiary alkyl of at least 4 carbon atoms and not more than 10 carbon atoms, R₄ is alkyl of not more than 8 carbon atoms, R₅ is selected from the group consisting of primary alkyl, secondary alkyl, alkenyl, alkoxyalkyl, and alkynyl each of not more than six carbon atoms, and X is halogen selected from the group consisting of chlorine, bromine and iodine.

33. An α-haloacetanilide of claim 32 wherein R₅ is primary alkyl of not more than 6 carbon atoms and X is chlorine.

34. An α-haloacetanilide of claim 32 wherein R₅ is secondary alkyl of not more than 6 carbon atoms and X is chlorine.

35. An α-haloacetanilide of claim 32 wherein R₅ is alkenyl of not more than 6 carbon atoms and X is chlorine.

36. 2′-tert-butyl-2-chloro-N,6′-dimethylacetanilide.

37. 2′ - tert - butyl - 2 - chloro - N - ethyl-6′-methylacetanilide.

38. 2′ - tert - butyl - 2 - chloro-N-isobutyl-6′-methylacetanilide.

39. N - allyl - 2′ - tert - butyl - 2 - chloro - 6′ - methylacetanilide.

40. A compound of the formula

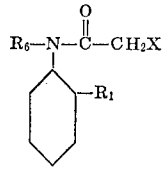

wherein $R_1$ is tertiary alkyl of from 4 to 10 carbon atoms, $R_6$ is selected from the group consisting of primary alkyl, alkenyl, and alkynyl each of not more than 4 carbon atoms, and X is halogen selected from the group consisting of chlorine, bromine and iodine.

41. An alpha-haloacetanilide of claim 40 wherein $R_6$ is primary alkyl of not more than 4 carbon atoms and X is chlorine.

42. An alpha-haloacetanilide of claim 40 wherein $R_6$ is alkenyl of not more than 4 carbon atoms and X is chlorine.

43. An alpha-haloacetanilide of claim 40 wherein $R_6$ is alkynyl of not more than 4 carbon atoms and X is chlorine.

44. N-allyl-2'-tert-butyl-2-chloracetanilide.

45. 2'-tert-butyl-2-chloro-N-n-propylacetanilide.

46. 2'-tert-butyl-2-chloro-N-methylacetanilide.

47. 2'-tert-butyl-2-chloro-N-ethylacetanilide.

48. 2'-tert-butyl-N-isobutyl-2-chloroacetanilide.

49. Alpha-haloacetanilide of the formula

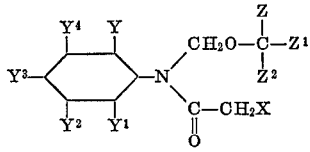

wherein Y and $Y^1$ are hydrogen, alkyl or alkoxy each of a maximum of 10 carbon atoms, and $Y^2$, $Y^3$ and $Y^4$ are hydrogen, halogen or alkyl having a maximum of 10 carbon atoms, Z, $Z^1$ and $Z^2$ are hydrogen, alkyl, hydroxyalkyl, haloalkyl, alkenyl, alkynyl, alkoxy or polyalkoxy each of from 1 to 18 carbon atoms, or hetero-cyclyl selected from the group consisting of furfuryl, thiofuranyl, pyrrolyl, thiazolyl, pyranyl, oxazinyl and triazinyl, and X is chlorine, bromine or iodine.

50. α-Haloacetanilide of claim 49 wherein $Y^2$, $Y^3$ and $Y^4$ are hydrogen.

51. α-Haloacetanilide of claim 49 wherein X is chlorine.

52. α-Haloacetanilide of claim 49 wherein X is chlorine, and $Y^2$, $Y^3$ and $Y^4$ are hydrogen.

53. α-Haloacetanilide of claim 49 wherein X is chlorine, $Y^2$, $Y^3$ and $Y^4$ are hydrogen and Z and $Z^2$ are hydrogen.

54. α-Haloacetanilide of claim 49 wherein X is chlorine $Y^2$, $Y^3$ and $Y^4$ are hydrogen and Z, $Z^1$ and $Z^2$ are hydrogen.

55. α-Haloacetanilide of claim 49 wherein X is chlorine, $Y^2$, $Y^3$ and $Y^4$ are hydrogen, Z, $Z^1$ and $Z^2$ are hydrogen and Y and $Y^1$ are alkyl.

56. α-Haloacetanilide of claim 49 wherein X is chlorine, Y and $Y^1$ are alkyl, $Y^2$, $Y^3$ and $Y^4$ are hydrogen, Z and $Z^2$ are hydrogen and $Z^1$ is alkyl.

57. 2-bromo-2'-tert-butyl-N-methoxymethyl - 6'-methyl-acetanilide.

58. 2-chloro - 2',6' - diethyl-N-(methoxymethyl)acetanilide.

59. 2-chloro - 2',6' - dimethyl-N-(isobutoxymethyl) acetanilide.

60. 2-chloro - N - isopropoxymethyl-2'6'-dimethylacetanilide.

61. 2-chloro - 2',6' - diethyl-N-[(2-isopropoxyethoxy)methyl]acetanilide.

62. 2-chloro - 2' - tert-butyl-N-(2-methoxyethoxymethyl)-6'-methylacetanilide.

63. 2-chloro - 6' - tert-butyl-N-[(2 - propynyloxy)methyl]-2'-methylacetanilide.

64. N-allyloxymethyl - 2 - bromo-2'-tert - butyl-6'-methylacetanilide.

65. 2-chloro - N - methoxymethyl-2',6'-dimethylacetanilide.

66. 2-chloro - 2',6' - diethyl - N - (ethoxymethyl)acetanilide.

67. 2-chloro - 2',6' - diethyl - N-(isopropoxymethyl) acetanilide.

68. N-allyloxymethyl-2-chloro-2',6'-diethylacetanilide.

69. 2-bromo-2' - t - butyl-6'-ethyl-N-(methoxymethyl) acetanilide.

70. 2-chloro-N-(methoxymethyl)acetanilide.

71. 2-chloro - 2' - t-butyl-N(1,3-dichloro-2-propoxymethyl)-6'-methylacetanilide.

References Cited

UNITED STATES PATENTS 2,863,752 12/1958 Hamm et al.
3,141,758 7/1964 Hamm et al. ____ __260—561 X

FOREIGN PATENTS 622,131 12/1962 Belgium.
917,924 2/1963 Great Britain.
139,051 2/1953 Sweden.
21,876 3/1955 Union of South Africa.

OTHER REFERENCES

Hamm et al., Agricultural and Food Chem., vol. 4, pp. 518–22 (1956).

HENRY R. JILES, *Primary Examiner.*

N. TROUSOF, *Assistant Examiner.*

U.S. Cl. X.R.

71—88, 90, 93, 95, 118; 260—244, 248, 302, 326.3, 332.2, 345.7, 347.2, 347.3, 561, 566, 573, 575, 577, 578, 999